United States Patent
Komoda et al.

(10) Patent No.: US 11,521,354 B2
(45) Date of Patent: Dec. 6, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Toshiyuki Komoda, Kanagawa (JP); Jun Ohashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/138,847

(22) Filed: Dec. 30, 2020

(65) Prior Publication Data
US 2022/0036655 A1    Feb. 3, 2022

(30) Foreign Application Priority Data
Aug. 3, 2020    (JP) .............................. JP2020-131929

(51) Int. Cl.
*G06T 19/00*    (2011.01)
*G06F 3/01*    (2006.01)

(52) U.S. Cl.
CPC .............. *G06T 19/00* (2013.01); *G06F 3/012* (2013.01); *G06F 3/013* (2013.01); *G06T 2200/24* (2013.01)

(58) Field of Classification Search
CPC .................................................. G06T 19/006
See application file for complete search history.

(56) References Cited

U.S. PATENT DOCUMENTS

| | | | |
|---|---|---|---|
| 6,608,615 B1 * | 8/2003 | Martins ............... | G06F 16/9577 345/157 |
| 2012/0249741 A1 * | 10/2012 | Maciocci .............. | G06T 15/503 348/46 |
| 2018/0261182 A1 * | 9/2018 | Zoshi .................... | G06V 30/416 |
| 2021/0208688 A1 * | 7/2021 | Richter ................. | G06T 19/006 |

FOREIGN PATENT DOCUMENTS

JP            2015231445        12/2015

* cited by examiner

*Primary Examiner* — Shivang I Patel
(74) *Attorney, Agent, or Firm* — JCIPRNET

(57) ABSTRACT

An information processing apparatus includes a processor configured to: display, in a virtual space recognized by a user, a first object at a position corresponding to a first coordinate system that is independent of the user's head movement; display, in the virtual space, a second object at a position corresponding to a second coordinate system that is dependent on the user's head movement; and change the first object to the second object in response to an operation performed by the user on the first object.

13 Claims, 17 Drawing Sheets

| AUTHENTICATION INFORMATION | | ATTRIBUTE INFORMATION | |
|---|---|---|---|
| USER ID | PASSWORD | GROUP ID | JOB INFORMATION |
| U11 | ... | G1,G2 | L1 |
| U12 | ... | G1,G3 | L2 |
| U13 | ... | G2 | L3 |
| ... | ... | ... | ... |

FIG. 4

| OBJECT ID | TYPE | NAME | DATA | |
|---|---|---|---|---|
| J21 | DOCUMENT | COMPANY A CONTRACT | ... | 122 |
| J22 | PHOTOGRAPH | PRODUCT B FRONT SIDE | ... | |
| J23 | SPREADSHEET | UNIT PRICE LIST | ... | |
| ... | ... | ... | ... | |

FIG. 5

| OBJECT ID | OWNER ID | AUTHORITY INFORMATION | APPEARANCE DATA | POSITION INFORMATION | FOLLOW INFORMATION | |
|---|---|---|---|---|---|---|
| J21 | U11 | ... | ... | (X1,Y1,Z1) | NO | 123 |
| J22 | U11 | ... | ... | — | YES | |
| J23 | U12 | ... | ... | ... | ... | |
| ... | ... | ... | ... | ... | ... | |

| OFFSET | | | ROTATION ANGLE | | |
|---|---|---|---|---|---|
| X0 | Y0 | Z0 | θx | θy | θz |
| ... | ... | ... | ... | ... | ... |

221

| TIME | X | z |
|---|---|---|
| 12:34:56 | ... | ... |
| 12:34:57 | ... | ... |

| OBJECT ID | MAGNIFICATION | POSITION | ORDER | DISPLAY ATTRIBUTE |
|---|---|---|---|---|
| ... | ... | ... | ... | ... |
| J22 | ... | ... | ... | ... |
| ... | ... | ... | ... | ... |

FIG. 13

| COMMAND | OPERATION CONDITION | |
|---|---|---|
| FOLLOW | LOOK AT OBJECT FOR THREE OR MORE SECONDS | 224 |
| CANCEL | LOOK AWAY FROM OBJECT FOR ONE MINUTE OR LONGER | |
| EDIT | ... | |
| ... | ... | |

FIG. 14

| ITEM | SETTING VALUE | |
|---|---|---|
| MODE | MANUAL | 225 |
| INTERRUPTION | PERMITTED | |
| ... | ... | |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-131929 filed Aug. 3, 2020.

BACKGROUND

(i) Technical Field

The present disclosure relates to an information processing apparatus and a non-transitory computer readable medium.

(ii) Related Art

For example, Japanese Unexamined Patent Application Publication No. 2015-231445 discloses technology for displaying a to-be-selected object, which is associated with the operation content of a gesture input, fixedly at a certain position in the view on a display screen of a head-mounted display (HMD).

SUMMARY

Aspects of non-limiting embodiments of the present disclosure relate to, in the case of handling objects such as documents in a virtual space, in response to an operation performed by a user, displaying objects required by the user within the user's view which changes as the user moves.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: display, in a virtual space recognized by a user, a first object at a position corresponding to a first coordinate system that is independent of the user's head movement; display, in the virtual space, a second object at a position corresponding to a second coordinate system that is dependent on the user's head movement; and change the first object to the second object in response to an operation performed by the user on the first object.

BRIEF DESCRIPTION OF THE DRAWINGS

An exemplary embodiment of the present disclosure will be described in detail based on the following figures, wherein:

FIG. 4 is a diagram illustrating an example of an object DB;

FIG. 5 is a diagram illustrating an example of an attribute DB;

FIG. 11 is a diagram illustrating an example of a follow DB;

FIG. 13 is a diagram illustrating an example of a command DB;

FIG. 14 is a diagram illustrating an example of a setting DB;

DETAILED DESCRIPTION

Exemplary Embodiment

Configuration of Information Processing System

Figure 1:
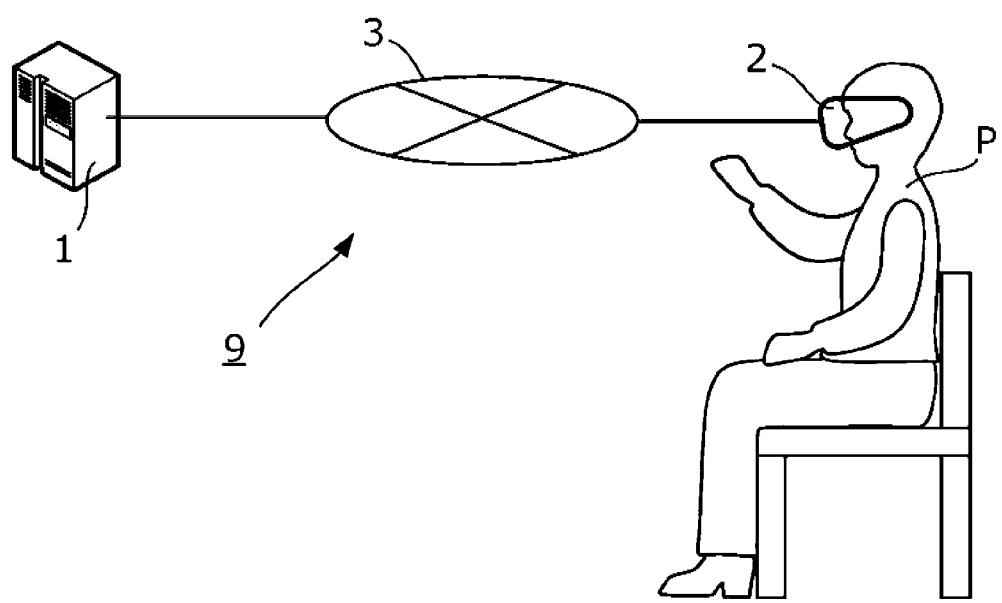
FIG. 1 is a diagram illustrating an example of the overall configuration of an information processing system.

FIG. 1 is a diagram illustrating an example of the overall configuration of an information processing system 9. The information processing system 9 illustrated in FIG. 1 is a system that provides a virtual three-dimensional space for handling objects such as documents to a user. The information processing system 9 includes an information processing apparatus 1, a terminal 2, and a communication line 3, as illustrated in FIG. 1. Hereinafter, in the case of describing the above-mentioned three-dimensional space described with reference to the drawings, a right-handed coordinate space is used.

The information processing apparatus 1 illustrated in FIG. 1 is a server apparatus that provides a virtual three-dimensional space for browsing and editing objects such as documents to a user P. The information processing apparatus 1 is, for example, a computer.

The terminal 2 illustrated in FIG. 1 is a terminal apparatus worn by the user P on his/her head to browse objects stored in the information processing apparatus 1. The terminal 2 is, for example, a display terminal such as so-called head-mounted virtual reality (VR) goggles.

The communication line 3 is a line that connects the information processing apparatus 1 and the terminal 2 so that they may be able to communicate with each other. The communication line 3 may be, for example, a local area network (LAN), a wide area network (WAN), the Internet, or a combination thereof. In addition, the communication line 3 may include the public switched telephone network (PSTN) or Integrated Services Digital Network (ISDN).

Note that the number of each of the information processing apparatus 1, the terminal 2, and the communication line 3 in the information processing system 9 is not limited to that illustrated in FIG. 1. For example, the information processing apparatus 1 may be constituted of a cluster system where multiple apparatuses share functions. In addition, the information processing system 9 may include multiple terminals 2. The information processing apparatus 1 may store, for each user who owns a corresponding one of the terminals 2, one or more objects owned by the user, and may set permissions for sharing these objects among users.

Configuration of Information Processing Apparatus

Figures 2, 3:
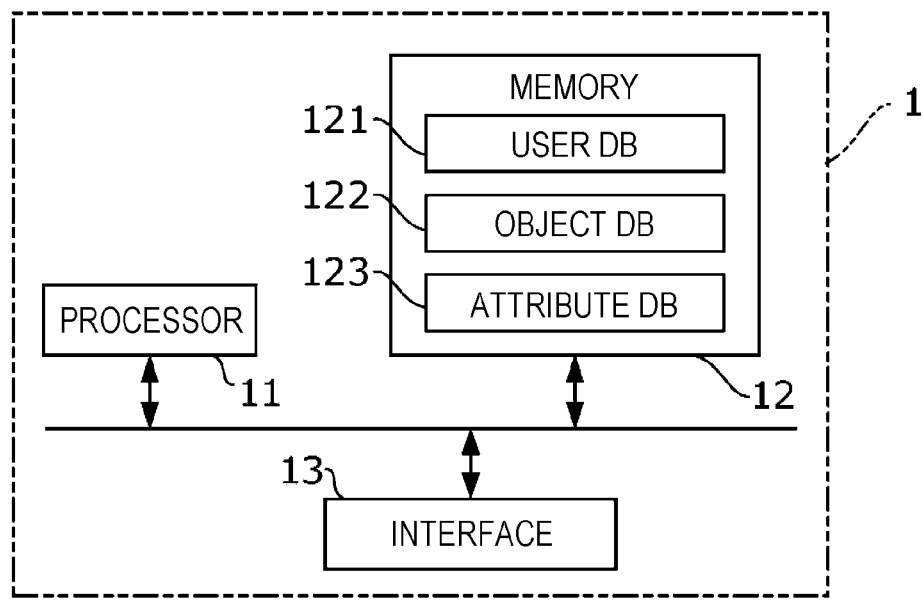
FIG. 2 is a diagram illustrating an example of the configuration of an information processing apparatus.
FIG. 3 is a diagram illustrating an example of a user database (DB)

FIG. 2 is a diagram illustrating an example of the configuration of the information processing apparatus 1. The information processing apparatus 1 illustrated in FIG. 2 includes a processor 11, memory 12, and an interface 13. These configurations are connected by, for example, a bus so that they may be able to communicate with each other.

The processor 11 controls each unit of the information processing apparatus 1 by reading and executing a program stored in the memory 12. The processor 11 is, for example, a central processing unit (CPU).

The interface 13 is a communication circuit that connects the information processing apparatus 1 to the terminal 2 via the communication line 3, which may be wired or wireless, so that they may be able to communicate with each other.

The memory 12 is a storage that stores an operating system, various programs, and data loaded to the processor 11. The memory 12 includes random-access memory (RAM) and read-only memory (ROM). Note that the memory 12 may include a solid-state drive or a hard disk drive. In addition, the memory 12 stores a user DB 121, an object DB 122, and an attribute DB 123.

FIG. 3 is a diagram illustrating an example of the user DB 121. The user DB 121 illustrated in FIG. 3 is a database that stores authentication information used for authenticating each user of the information processing system 9, and attribute information indicating each user's attributes.

In the user DB 121 illustrated in FIG. 3, authentication information is a set of a user identification (ID) and a password. A user ID is identification information for identifying each user of the information processing system 9. A password is a character string or the like that only a user identified by a corresponding user ID knows. In the user DB 121 illustrated in FIG. 3, attribute information includes a group ID and job information. A group ID is identification information for identifying a group, such as a department or a project to which a user identified by a corresponding user ID belongs. In the group ID field, plural group IDs may be entered. Job information is information that describes the job scope and authority of a user identified by a corresponding user ID.

FIG. 4 is a diagram illustrating an example of the object DB 122. The object DB 122 is a database that stores each of objects displayed in the above-mentioned virtual three-dimensional space. The object DB 122 illustrated in FIG. 4 stores, for each object, the items including object ID, type, name, and data. An object ID is identification information for identifying an object. A type is the type of an object, and is represented by a character string such as document, photograph, or spreadsheet. A name is a name given to an object, and is represented by a character string for the user to roughly determine the content of the object, such as "Company A Contract". Data is the content itself of an object.

FIG. 5 is a diagram illustrating an example of the attribute DB 123. The attribute DB 123 is a database that stores the attributes of the above-mentioned objects. The attribute DB 123 illustrated in FIG. 5 stores, for each object, the items including object ID, owner ID, authority information, appearance data, position information, and follow information.

An object ID is identification information for identifying an object, and is information common to an object ID included in the object DB 122 illustrated in FIG. 4. An owner ID is identification information of a user who is the owner of an object. Authority information is information that describes authority to execute various types of processing such as browsing, changing, and executing an object. Authority information is defined using, for example, attribute information of a user identified by an owner ID.

Appearance data is data indicating the shape, pattern, or the like of an object displayed in the virtual three-dimensional space. This appearance data may be, for example, so-called icon image data, which is determined in advance according to the type of object. Alternatively, this appearance data may be so-called thumbnail image data, which displays the content of an object in a reduced size.

Position information is information that, in the case where an object is displayed at a position corresponding to a first coordinate system in the above-mentioned virtual three-dimensional space, represents that position in the first coordinate system. Here, the first coordinate system includes coordinates corresponding to the inertial system coordinates in the real space where the user is present. Since the first coordinate system includes coordinates that depend on the user's environment, the first coordinate system is not affected by, for example, the posture and position of the terminal 2 worn by the user P illustrated in FIG. 1 on his/her head. In short, the first coordinate system is a coordinate system independent of the user's head movements. Hereinafter, the first coordinate system is represented as an XYZ right-handed system coordinate space having the X-axis, Y-axis, and Z-axis orthogonal to one another at an origin O1 in the drawings.

Follow information is information indicating whether a position at which an object is displayed follows a second coordinate system. Here, the second coordinate system is a coordinate system according to the position and posture of the terminal 2 worn by the user on his/her head. In short, the second coordinate system is a coordinate system that depends on the user's head movements. Hereinafter, the second coordinate system is represented as an xyz right-handed system coordinate space having the x-axis, y-axis, and z-axis orthogonal to one another at an origin O2 in the drawings.

The second coordinate system is, for example, a so-called head-centered coordinate system of the user P wearing the terminal 2 illustrated in FIG. 1. In this case, the second coordinate system has, for example, the midpoint of a line segment connecting the center of eyeballs of both eyes as the origin O2, and a front direction in which the user's face faces as the y-axis direction. Note that the second coordinate system defines, for example, the x-axis as a horizontal direction around the user P's head, and z-axis as a vertical direction.

In the attribute DB 123, an object with "no" in its follow information field does not follow the second coordinate system, but follows the first coordinate system. An object that follows the first coordinate system is described as a "first object" in the following description. A first object is displayed by the terminal 2 at a position corresponding to the first coordinate system.

In addition, an object with "yes" in its follow information field does not follow the first coordinate system, but follows the second coordinate system. An object that follows the second coordinate system is described as a "second object" in the following description. A second object is displayed by the terminal 2 at a position corresponding to the second coordinate system.

In the information processing system 9, the information processing apparatus 1 rewrites, for example, "no" in the follow information field indicating an attribute of any of the objects in the attribute DB 123 to "yes", thereby changing a corresponding first object to a second object. In addition, by rewriting the follow information field from "yes" to "no", the information processing apparatus 1 changes a corresponding second object to a first object.

Since a second object with "yes" in its follow information field is displayed at a position corresponding to the second coordinate system, it is unnecessary to refer to "position information" indicating a position in the first coordinate system in the attribute DB 123. The information processing apparatus 1 may delete the position information field corresponding to a second object in the attribute DB 123, or may write " " meaning undefined.

Configuration of Terminal

Figure 6:
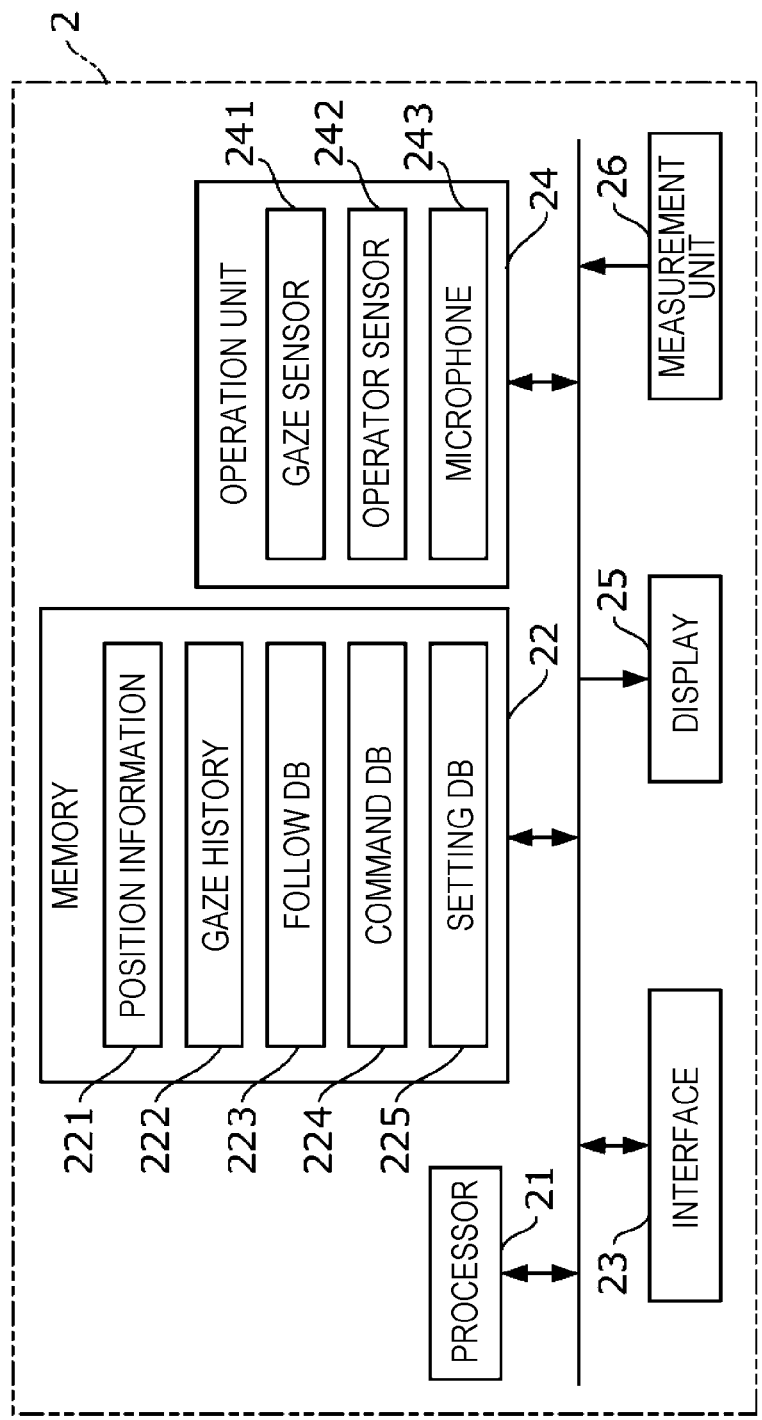
FIG. 6 is a diagram illustrating an example of the configuration of a terminal.

FIG. 6 is a diagram illustrating an example of the configuration of the terminal 2. The terminal 2 illustrated in FIG. 6 includes a processor 21, memory 22, an interface 23, an operation unit 24, a display 25, and a measurement unit 26. These configurations are connected by, for example, a bus so that they may be able to communicate with each other.

The processor 21 controls each unit of the terminal 2 by reading and executing a program stored in the memory 22. The processor 21 is, for example, a CPU.

The interface 23 is a communication circuit that connects the terminal 2 and the information processing apparatus 1 via the communication line 3, which may be wired or wireless, so that they may be able to communicate with each other.

The operation unit 24 includes operation buttons for giving various commands. The operation unit 24 receives an operation and sends a signal in accordance with the operation content to the processor 21. In addition, the operation unit 24 includes a gaze sensor 241, an operator sensor 242, and a microphone 243.

The gaze sensor 241 is a sensor that detects the gaze of a user wearing the terminal 2. The gaze sensor 241 is a so-called eye tracker. The gaze sensor 241 includes an imaging element such as a complementary metal oxide semiconductor (CMOS) image sensor or a charge-coupled device (CCD) image sensor, captures an image of the eyeball of a user wearing the terminal 2, and detects/measures a direction pointed by the user's gaze. The gaze sensor 241 may include a sensor that contacts the eyeball.

The operator sensor 242 is a sensor that detects a hand, a finger, or the like of a user wearing the terminal 2 as an operator. The operator sensor 242 captures an image of, for example, the user's hand, finger, or the like using an imaging element, and measures its position by analyzing the captured image. Note that the operator sensor 242 may include a sensor that is worn on the user's hand, finger, or the like. In addition, the operation unit 24 may include a device such as a pointer or a controller owned by the user as an operator used by the user. In this case, the operator sensor 242 is provided on this device, and the operator sensor 242 simply detects the device's position and posture.

The microphone 243 is a sound-collecting device that collects the voice of a user wearing the terminal 2. The user's voice collected by the microphone 243 is voice-recognized by the processor 21 and is analyzed as an operation for the terminal 2. Note that the terminal 2 may not perform an operation based on voice recognition. In this case, the terminal 2 need not include the microphone 243.

The measurement unit 26 is a device that measures the position and posture of the terminal 2 in the first coordinate system, and includes, for example, an acceleration sensor and an angular velocity sensor.

The display 25 has a display screen such as a liquid crystal display arranged to cover the field of view of a user wearing the terminal 2 on his/her head. Under control of the processor 21, the display 25 displays an image on the display screen. Note that the display 25 may include a so-called retinal projection display that directly projects laser light to the user's retina and displays an image.

The memory 22 is a storage that stores an operating system, various programs, and data loaded to the processor 21. The memory 22 includes RAM and ROM. Note that the memory 22 may include a solid-state drive or a hard disk drive.

In addition, the memory 22 stores position information 221, a gaze history 222, a follow DB 223, a command DB 224, and a setting DB 225.

Figures 7, 8:
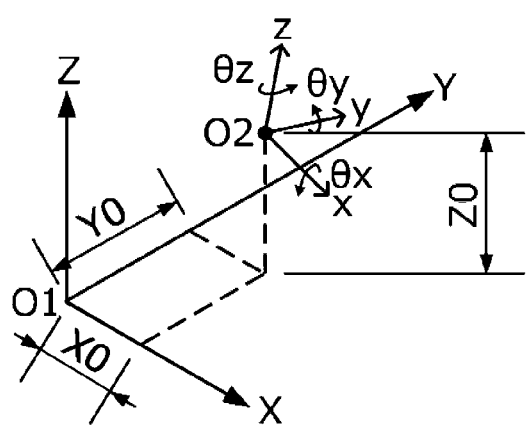
FIG. 7 is a diagram illustrating an example of position information.
FIG. 8 is a diagram for describing an offset and a rotation angle stored in the position information.

The position information 221 stores the position and posture of the terminal 2, measured by the measurement unit 26. FIG. 7 is a diagram illustrating an example of position information. The position information 221 illustrated in FIG. 7 includes an offset field consisting of three numerical values, X0, Y0, and Z0, and a rotation angle field consisting of three numerical values θx, θy, and θz.

FIG. 8 is a diagram for describing an offset and a rotation angle stored in the position information 221. The above-mentioned offset is a set of numerical values representing the position of the origin of the second coordinate system, which serves as the basis for the terminal 2, in the first coordinate system. In addition, the above-mentioned rotation angle is a set of numerical values representing the slope of each of the x-axis, y-axis, and z-axis of the second coordinate system, with respect to the X-axis, Y-axis, and Z-axis of the first coordinate system. The position and posture of the terminal 2 in the first coordinate system are identified by the offset and the rotation angle.

Figures 9, 10:
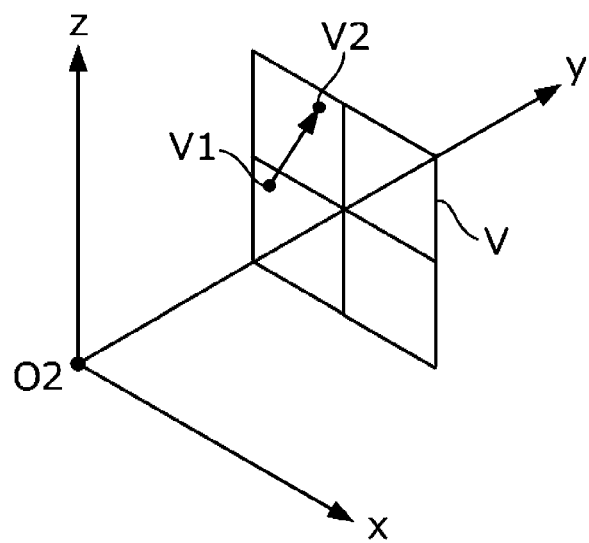
FIG. 9 is a diagram illustrating an example of a gaze history.
FIG. 10 is a diagram for describing the relationship between a second coordinate system and a user's field of view.

The gaze history 222 illustrated in FIG. 6 is a history of the gaze measured by the gaze sensor 241 of the above-mentioned operation unit 24. FIG. 9 is a diagram illustrating an example of the gaze history 222. The gaze history 222 illustrated in FIG. 9 stores the items including time, x, and z in association with each other. The gaze sensor 241 measures the user's gaze at a predetermined cycle, such as every 0.1 seconds or every second, and supplies the measured result to the processor 21. The processor 21 stores information indicating the user's gaze measured by the gaze sensor 241, along with the measurement time, in the gaze history 222. The time field in the gaze history 222 is a field for storing the time at which the gaze sensor 241 measured the user's gaze. In addition, the x and z fields in the gaze history 222 are coordinates on the xz plane indicating the user's field of view.

FIG. 10 is a diagram for describing the relationship between the second coordinate system and the user's field of view V. The second coordinate system, which depends on the user's head movements, is represented by the xyz right-handed system coordinates indicated by the x-axis, y-axis, and z-axis orthogonal to one another at the origin O2, as illustrated in FIG. 10. Here, the +y direction is the user's front direction. The user's field of view V is defined on a plane parallel to the x-axis and the z-axis, which is located at a position advanced by a predetermined distance in the +y direction from the origin O2. A point at which the field of view V, which is a plane, and the gaze direction crosses is identified by the processor 21 as a point on which the user focuses. Accordingly, for example, in the case where the gaze moves from point V1 to point V2 on the field of view V illustrated in FIG. 10, the x coordinate and the y coordinate of each of point V1 and point V2 are stored, along with the measurement time, in the gaze history 222.

The follow DB 223 illustrated in FIG. 6 is a database that stores, for each second object, parameters indicating the display form of the second object. FIG. 11 is a diagram illustrating an example of the follow DB 223. The follow DB 223 illustrated in FIG. 11 stores the items including object ID, magnification, position, order, and display attribute in association with each other.

An object ID is the identification information of an object with "yes" in its field for following the second coordinate system in the attribute DB 123 of the information processing apparatus 1, namely, a second object. A magnification is information indicating the magnification, with respect to a reference, of the size of a corresponding second object displayed in the above-mentioned field of view V. A position is information indicating the position of a second object in the second coordinate system. An order is information indicating the order, viewed from the user, of each of second objects stored in the follow DB 223 in the case where the second objects are overlappingly arranged. A display attribute is information indicating, for example, the color of a frame arranged around a corresponding second object, various decorations, or the like.

Figure 12A:
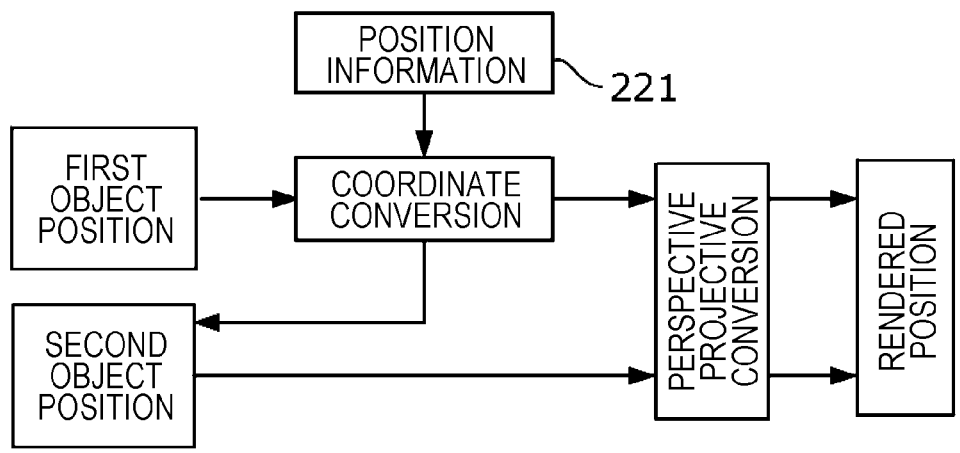
FIGS. 12A and 12B are diagrams for describing the relationship between the position of a stored object and a rendered position.
Figure 12B:
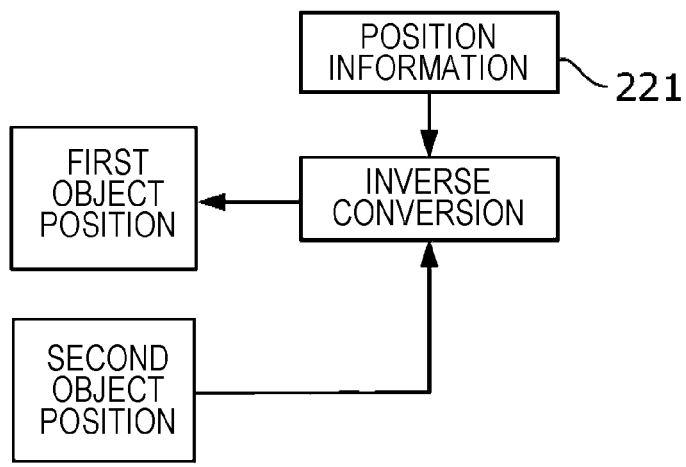

FIGS. 12A and 12B are diagrams for describing the relationship between the position of a stored object and a rendered position. Here, a rendered position is a position at which an object is displayed on the display screen of the display 25 of the terminal 2.

The position of a first object is a position stored in the attribute DB 123 of the information processing apparatus 1, and is represented as coordinates of the first coordinate system. In addition, the position of a second object is a position stored in the follow DB 223 of the terminal 2, and is represented as coordinates of the second coordinate system.

As illustrated in FIG. 12A, the processor 21 of the terminal 2 performs coordinate conversion of the position of a first object to a position in the second coordinate system on the basis of the position information 221, and further performs perspective projective conversion to obtain a rendered position in the field of view V. Accordingly, the first object is displayed at a position corresponding to the first coordinate system in a virtual space recognized by the user. In short, the processor 21 is an example of a processor that displays, in a virtual space recognized by a user, a first object at a position corresponding to a first coordinate system that is independent of the user's head movement.

In addition, the processor 21 performs perspective projective conversion of the position of a second object to obtain a rendered position in the field of view V. Accordingly, the second object is displayed at a position corresponding to the second coordinate system in the virtual space. In short, the processor 21 is an example of a processor that displays, in the virtual space, a second object at a position corresponding to the second coordinate system dependent on the user's head movement.

In the case of changing a first object to a second object, the processor 21 performs coordinate conversion of the position of the first object on the basis of the position information 221, and stores the obtained position in the second coordinate system as the position of a second object after the change in the follow DB 223.

In addition, in the case of changing a second object to a first object, as illustrated in FIG. 12B, the processor 21 performs inverse conversion of the position of the second object on the basis of the position information 221 to calculate a position in the first coordinate system, and sends this position to the information processing apparatus 1. The processor 11 of the information processing apparatus 1 stores information of the sent position as information of the position of a first object after the change in the attribute DB 123.

The command DB 224 illustrated in FIG. 6 is a database that stores, for each operation received by the operation unit 24 of the terminal 2, an operation condition which is a condition whose satisfaction is determined, and the content of a command indicated by that operation when the operation condition is satisfied, in association with each other.

FIG. 13 is a diagram illustrating an example of the command DB 224. In the command DB 224 illustrated in FIG. 13, the operation condition field stores, for example, a condition satisfied by the movements of the gaze measured by the gaze sensor 241, a condition satisfied by a path traced by an operator measured by the operator sensor 242, and a condition satisfied by a character string obtained by voice-recognizing voice collected by the microphone 243. In addition, the command field stores, for example, on receipt of an operation that satisfies a corresponding operation condition, the content of a command such as to select an object identified by the operation and make the object follow the movements of the terminal 2, to cancel the object's following the movements of the terminal 2, to edit the object, or the like.

For example, when a user wearing the terminal 2 looks at a first object displayed in the virtual space for three or more seconds, the operation unit 24 of the terminal 2 detects this gaze by using the gaze sensor 241. On the basis of information of the detected gaze and the command DB 224, the processor 21 detects an operation based on this gaze as an operation of changing a first object to a second object to follow the movements of the terminal 2. In addition, when the user looks away from any of second objects for one or more minutes, that second object's following the movements of the terminal 2 is cancelled, and that second object returns to a first object.

FIG. 14 is a diagram illustrating an example of the setting DB 225. The setting DB 225 is a database that stores settings regarding the operation of the terminal 2. In the setting DB 225 illustrated in FIG. 14, the item field stores a to-be-set item. In addition, the setting value field stores a value set to a corresponding item.

For example, the setting DB 225 illustrated in FIG. 14 stores the item "mode". This item is an item indicating "mode" indicating whether to change a first object to a second object, which is triggered by the start of editing the first object. In the case of the setting DB 225 illustrated in FIG. 14, since "manual" is stored in the item "mode", a change from a first object to a second object is not performed simply by starting editing. Instead, a change from a first object to a second object is performed when a change command is separately given by a manual operation.

In addition, for example, the item "interruption" is a field indicating whether to permit a process interruption. Here, a process interruption is, in response to a command to execute a process (second process) that takes precedence over a process being executed (first process), interrupting the first process to execute the second process, and, as soon as the second process is completed, resuming the first process. In the case of the setting DB 225 illustrated in FIG. 14, since "permitted" is set in the field "process interruption", process interruptions are permitted.

Functional Configuration of Terminal

Figure 15:
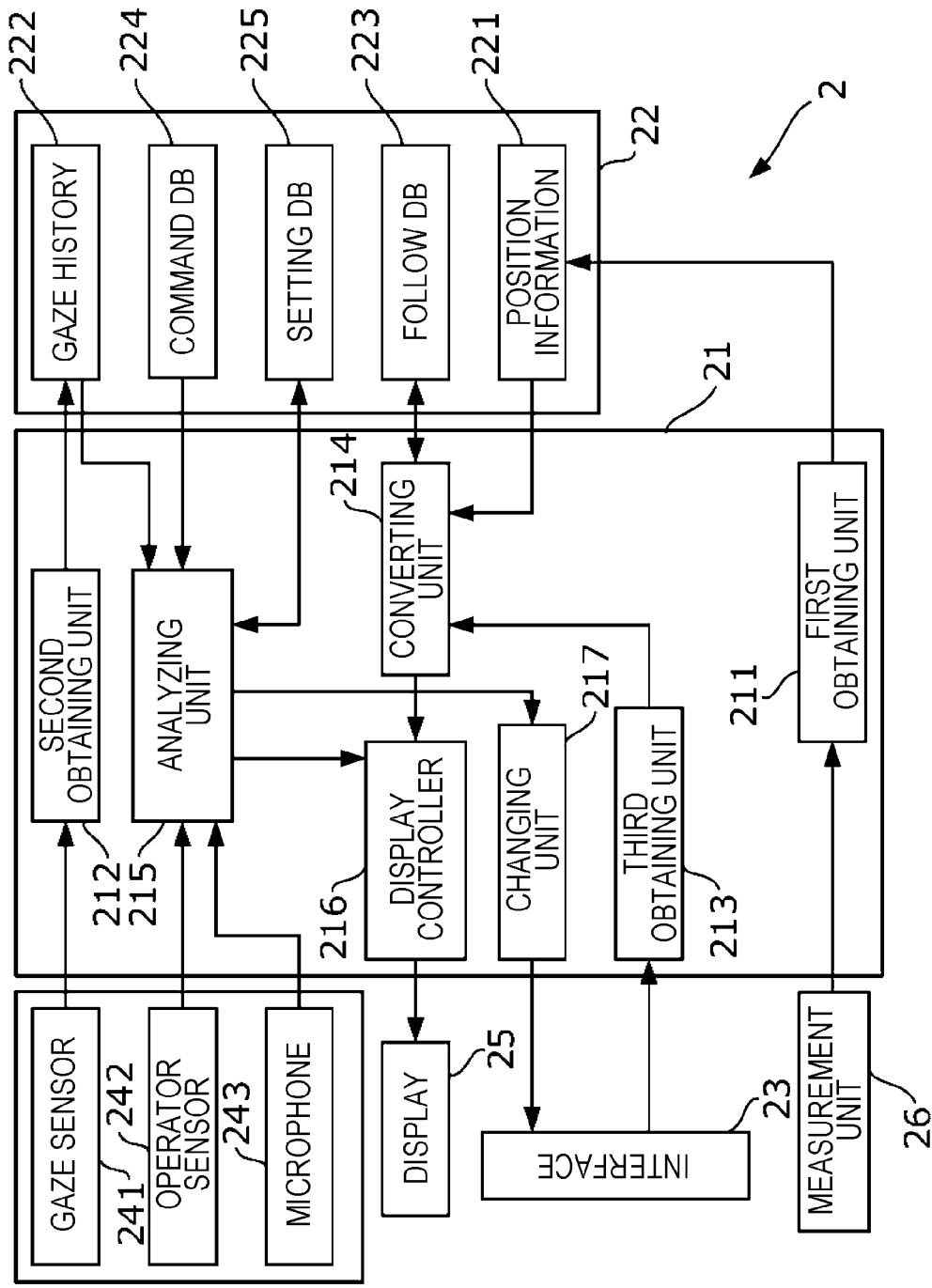
FIG. 15 is a diagram illustrating an example of the functional configuration of the terminal.

FIG. 15 is a diagram illustrating an example of the functional configuration of the terminal 2. The processor 21 of the terminal 2 executes a program stored in the memory 22, thereby functioning as a first obtaining unit 211, a second obtaining unit 212, a third obtaining unit 213, a converting unit 214, an analyzing unit 215, a display controller 216, and a changing unit 217.

The first obtaining unit 211 obtains information of the position and posture of the terminal 2, measured by the measurement unit 26. On the basis of the information, the first obtaining unit 211 writes an offset and a rotation angle in the position information 221.

The second obtaining unit 212 obtains information of the gaze detected by the gaze sensor 241 of the operation unit 24, and stores the information, along with time, in the gaze history 222.

The third obtaining unit 213 obtains the position and data of a first object from the information processing apparatus 1 via the interface 23 and the communication line 3 illustrated in FIG. 1.

The converting unit 214 converts the position of the first object, obtained by the third obtaining unit 213, to a rendered position on the basis of the position information 221. In addition, the converting unit 214 reads the position of a second object from the follow DB 223, and performs perspective projective conversion of this position to convert it to a rendered position.

The analyzing unit 215 reads a history of the user's gaze, obtained by the second obtaining unit 212, from the gaze history 222 of the memory 22. In addition, the analyzing unit 215 obtains information of operations based on the user's operator and conversations from the operator sensor 242 and the microphone 243 of the operation unit 24. The analyzing unit 215 reads the setting DB 225 and the command DB 224 of the memory 22, and, on the basis of the read information, analyzes operations based on the gaze history, operator movements, and conversations.

The display controller 216 displays first objects and second objects, which are converted by the converting unit 214 to rendered positions, on the display 25 in accordance with the content of operations analyzed by the analyzing unit 215.

In accordance with the content of an operation analyzed by the analyzing unit 215, the changing unit 217 conveys an object changing command to the information processing apparatus 1 via the interface 23. On receipt of the command, the information processing apparatus 1 rewrites the follow information field of the attribute DB 123 in the memory 12 in accordance with the command. Accordingly, changes are performed from a first object to a second object and from a second object to a first object.

Operation of Terminal

Figure 16:
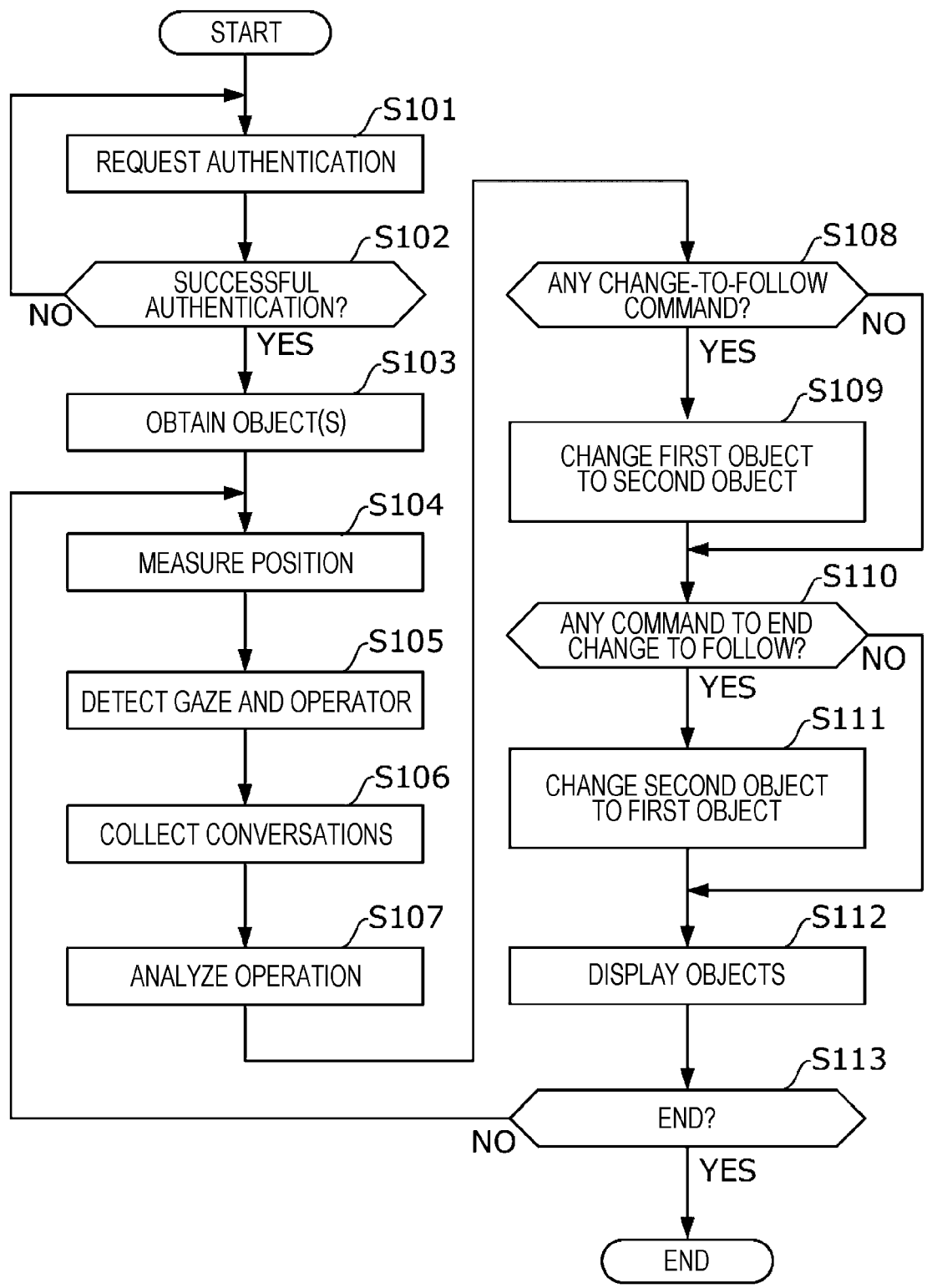
FIG. 16 is a flowchart illustrating an example of the flow of the operation of the terminal.

FIG. 16 is a flowchart illustrating an example of the flow of the operation of the terminal. In response to activation of the terminal 2 by pressing of a power button (not illustrated) of the operation unit 24 of the terminal 2, the processor 21 of the terminal 2 receives an input of a user ID and a password of a user wearing the terminal 2. This input may be received by, for example, the movement of an operator detected by the operator sensor 242. The processor 21 sends the set of the input user ID and password to the information processing apparatus 1 via the interface 23 and the communication line 3, and requests for authentication (step S101). The information processing apparatus 1 performs the requested authentication by referring to the user DB 121 in the memory 12, and returns the result to the terminal 2.

Note that the terminal 2 may receive an input of authentication information, such as a password and the like, not from the movement of an operator, but using other methods. For example, the terminal 2 may extract the user's iris information from a captured image of the user's eyeball, and send this as the user's authentication information to the information processing apparatus 1. In this case, the information processing apparatus 1 may simply store iris information in the user DB 121.

The processor 21 receives the authentication result from the information processing apparatus 1, and determines whether the authentication is successful (step S102). In the case where it is determined that the authentication is not successful (NO in step S102), the processor 21 returns the process to step S101, and repeatedly requests for authentication.

In contrast, in the case where it is determined that the authentication is successful (YES in step S102), the processor 21 obtains, from the information processing apparatus 1, data of one or more objects permitted for the user of the terminal 2 to browse (step S103).

The processor 21 measures the position of the terminal 2 using the measurement unit 26 (step S104). In addition, the processor 21 detects the user's gaze using the gaze sensor 241, and detects the movements of an operator such as the user's hand, finger, or the like using the operator sensor 242 (step S105). In addition, the processor 21 collects the user's conversations using the microphone 243 (step S106).

The processor 21 analyzes operations based on each of the gaze, operator, and conversations on the basis of the command DB 224 (step S107), and determines whether there is a command to change a first object to a second object (step S108).

Changing a first object to a second object is changing a first object displayed at a position fixed to the first coordinate system independent of head movements to a second object displayed at a position corresponding to the second coordinate system dependent on head movements. In short, since this change is a change of a first object to a second object displayed at a position that follows the head, this change may also be referred to as a "change to follow" hereinafter.

In the case where it is determined that there is a change-to-follow command mentioned above (YES in step S108), the processor 21 changes a first object identified by the above-mentioned operation to a second object (step S109). In contrast, in the case where it is determined that there is no change-to-follow command (NO in step S108), the processor 21 advances the process to the next step S110, without performing step S109. In short, the processor 21 is an example of a processor that changes a first object to a second object in response to an operation performed by the user on the first object.

Figure 17:
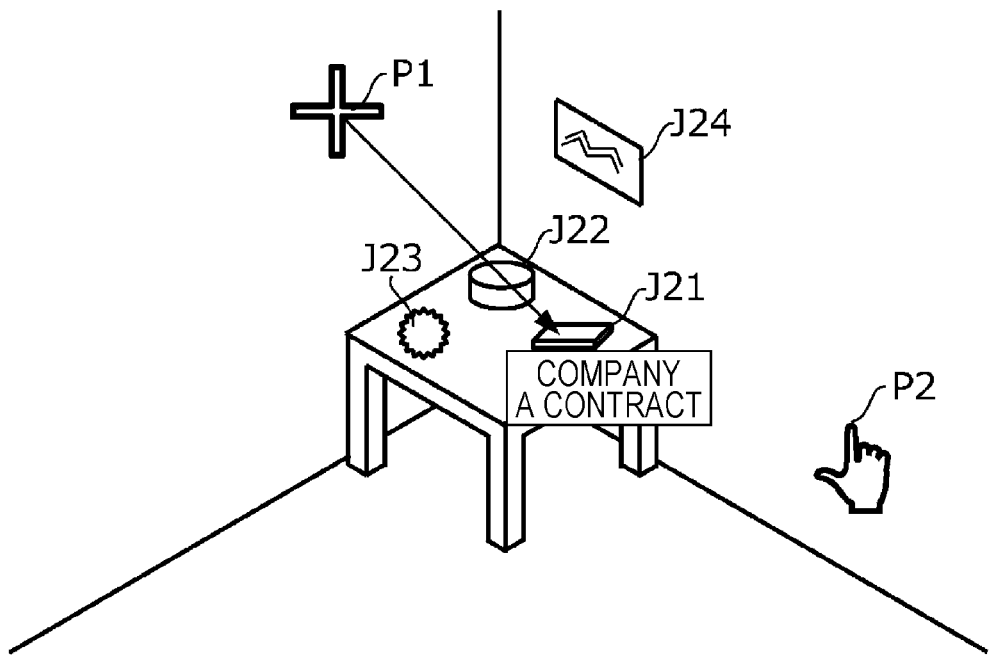
FIG. 17 is a diagram illustrating an example of a virtual space viewed by the user.

FIG. 17 is a diagram illustrating an example of a virtual space viewed by a user. The virtual space illustrated in FIG. 17 is a virtual three-dimensional space that is visually recognized, on the display 25, by a user wearing the terminal 2 on his/her head. As illustrated in FIG. 17, it is displayed in this virtual space that objects J21, J22, and J23 are placed on a virtual workbench. In addition, an object J24 is hung on the right wall illustrated in FIG. 17. These objects are displayed respectively in the virtual space using the appearance data in the attribute DB 123 stored in the memory 12 of the information processing apparatus 1.

In addition, a viewpoint P1 illustrated in FIG. 17 is a point on which the user's gaze is focused in the above-mentioned virtual space. An operation point P2 is a point corresponding to a place where there is an operator such as the user's hand or finger in the virtual space illustrated in FIG. 17.

For example, when the user looks at the object J21 for three or more seconds, the processor 21 analyzes this as a change-to-follow command to change the object J21, which is a first object, to a second object. In the case where it is set in the setting DB 225 that, for example, the analyzed operation is to be confirmed using a dialogue, the processor 21 displays a dialogue for confirming the change to follow on the display 25.

Figure 18:
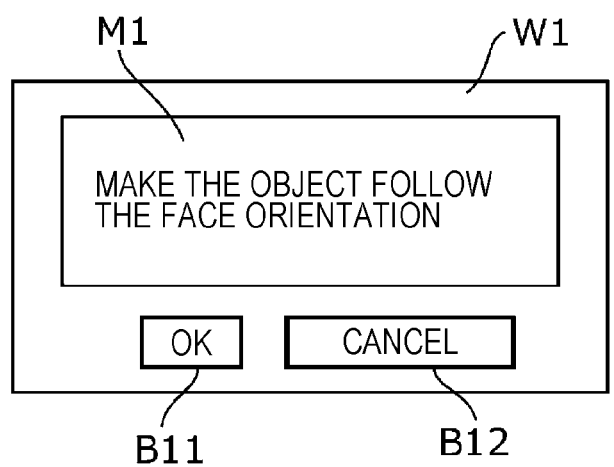
FIG. 18 is a diagram illustrating an example of a dialogue for confirming a change to follow.

FIG. 18 is a diagram illustrating an example of a dialogue for confirming the change to follow. A dialogue window W1 included in the dialogue displays a message M1, which reads "Make the object follow the face orientation". Under the message M1, a button B11 with the character string "OK" and a button B12 with the character string "cancel" are displayed.

For example, when the user moves an operator such as the user's hand or finger to allow the operation point P2 to overlap the button B11 illustrated in FIG. 18 and makes a predetermined gesture such as tapping, the object J21 at which the user has looked for three or more seconds is changed from a first object to a second object. That is, in this case, the processor 21 gives a change-to-follow command to the information processing apparatus 1. The processor 11 of the information processing apparatus 1 having received the command rewrites, in the attribute DB 123, the follow information field of the object J21 to "yes". In addition, the processor 21 adds data of the object J21 to the follow DB 223.

In the above-described example, an operation to give a change-to-follow command is performed using the user's gaze, and is "looking at the object J21 for three or more seconds". This is an operation that satisfies the condition that the direction of the user's gaze and the position at which the object J21 is displayed have the predetermined relationship (first relationship) "overlap for three or more seconds". In short, an operation to give a change-to-follow command in the above-described example is an example of an operation using a user's gaze. The processor 21 in this example is an example of a processor that, in the case where the direction of the gaze and the position at which a first object is displayed have a predetermined first relationship, changes the first object to a second object.

Figure 19:
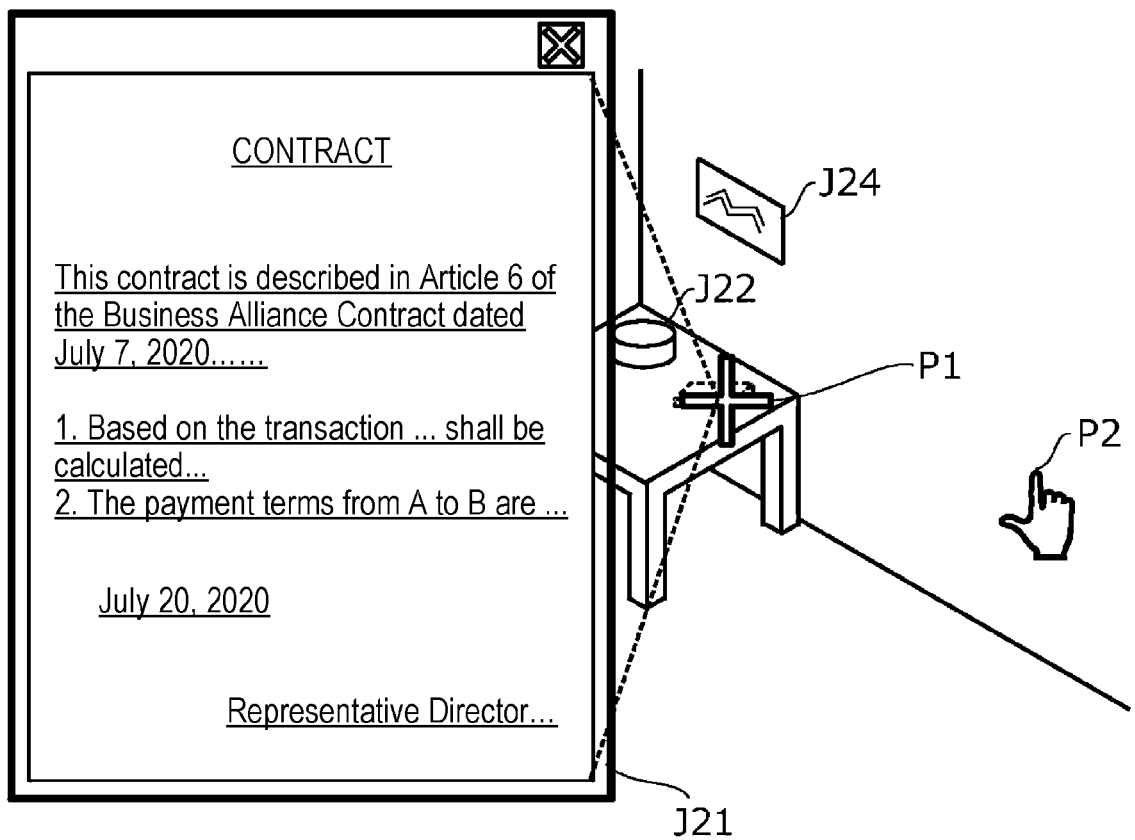
FIG. 19 is a diagram illustrating an example of an object edited in the virtual space.

FIG. 19 is a diagram illustrating an example of an object edited in the virtual space. In the virtual space illustrated in FIG. 18, when the user selects the object J21 with an operation using the gaze and starts editing, as illustrated in FIG. 19, the processor 21 of the terminal 2 displays the object J21 in an editable form.

Here, the object J21 is a document named "Company A Contract", and, as illustrated in FIG. 19, its text is displayed so that it will fit in the user's field of view. At this time, since the object J21 has been changed from a first object to a second object, the object J21 is displayed at a position corresponding to the second coordinate system dependent on the user's head movements. Therefore, when the user moves his/her head, the terminal 2 worn on his/her head also moves accordingly, and the second coordinate system changes, thereby maintaining the relative positional relationship between the origin O2 of the second coordinate system and a second object. In short, because the object J21, which has been changed to a second object, follows the user's head movements, the user will not lose sight of the object J21 from the field of view V.

As illustrated in FIG. 16, the processor 21 determines whether there is a command to end the above-mentioned change to follow on the basis of the analyzed operation (step S110). A command to end the change to follow is a command to further change the object, for which a change-to-follow command has been given to change a first object to a second object, back to a first object again.

In the case where it is determined that there is a command to end the change to follow (YES in step S110), the processor 21 changes a second object identified by the above-mentioned operation to a first object (step S111). In contrast, in the case where it is determined that there is no command to end the change to follow (NO in step S110), the processor 21 advances the process to the next step S112, without performing step S111.

For example, when the user looks away from the object J21, which is being edited, for one minute or longer, the processor 21 analyzes this as a command to change the object J21, which has already been changed to a second object, back to a first object (i.e., a command to end the change to follow). In the case where it is set in the setting DB 225 that, for example, the analyzed operation is to be confirmed using a dialogue, the processor 21 displays a dialogue for confirming the end of the change to follow on the display 25.

Figure 20:
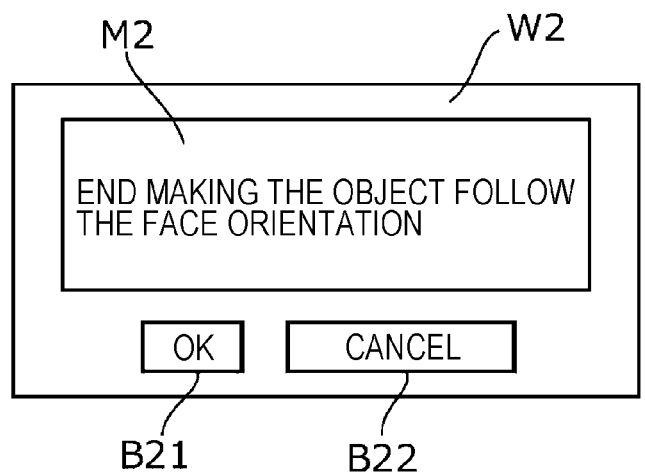
FIG. 20 is a diagram illustrating an example of a dialogue for confirming the completion of the change to follow.

FIG. 20 is a diagram illustrating an example of a dialogue for confirming the end of the change to follow. A dialogue window W2 included in the dialogue displays a message M2, which reads "End making the object follow the face orientation". Under the message M2, a button B21 with the character string "OK" and a button B22 with the character string "cancel" are displayed.

For example, when the user moves an operator such as the user's hand or finger to allow the operation point P2 to overlap the button B21 illustrated in FIG. 20 and makes a predetermined gesture such as tapping, the object J21 from which the user has looked away for one minute or longer is changed from a second object to a first object. That is, in this case, the processor 21 gives a command to end the change to follow to the information processing apparatus 1. The processor 11 of the information processing apparatus 1 having received the command rewrites, in the attribute DB 123, the follow information field of the object J21 to "no". In addition, the processor 21 deletes data of the object J21 from the follow DB 223.

In the above-described example, when the condition that the user looks away from the object J21, which is being edited, for one minute or longer (first condition) is satisfied, the object J21 is changed from a second object to a first object. In short, the processor 21 in the above-described example is an example of a processor that changes a second object to a first object when a predetermined first condition is satisfied.

The processor 21 confirms whether there are a change-to-follow command and a command to end the change to follow, changes objects in accordance with these commands, and then displays these objects in the virtual space (step S112). The processor 21 determines whether an end condition is satisfied (step S113), and, in the case where the processor 21 determines that the end condition is not satisfied (NO in step S113), returns the process to step S104. In contrast, in the case where the processor 21 determines that the end condition is satisfied (YES in step S113), the processor 21 ends the process.

With the above-described operation, the terminal 2 in the information processing system 9 changes, in response to a user operation, a first object displayed at a position corresponding to the first coordinate system independent of the user's head movements to a second object displayed at a position corresponding to the second coordinate system dependent on the head movements. Accordingly, when the user performs an operation to change a necessary first object to a second object, the second object after the change is displayed to follow the user's head movements. In doing so, the user will not lose sight of the second object. In addition, by leaving unnecessary objects as they are as first objects, the user may distinguishably recognize necessary second objects and these unnecessary first objects.

MODIFICATIONS

So far is the description of the exemplary embodiment; now, the content of the exemplary embodiment may be modified as follows. In addition, the following modifications may be combined with one another.

First Modification

Although the terminal 2 includes the processor 21 including a CPU in the above-described exemplary embodiment, a controller that controls the terminal 2 may be other configurations. For example, the terminal 2 may include various processors other than a CPU.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

Second Modification

In the embodiments above, the term "processor" is broad enough to encompass one processor or plural processors in collaboration which are located physically apart from each other but may work cooperatively. For example, although the information processing system 9 includes one information processing apparatus 1, the information processing system 9 may include multiple information processing apparatuses 1 which are connected to each other so that they may be able to communicate with each other, thereby realizing a cluster system in which functions are shared by these information processing apparatuses 1.

The order of operations of the processor is not limited to one described in the embodiments above, and may be changed.

Third Modification

In the above-described exemplary embodiment, each terminal 2 may have one or more of the functions of the information processing apparatus 1. In this case, each terminal 2 may store a database stored in the memory 12 of the information processing apparatus 1. In this case, one terminal 2 and another terminal 2 need not be connected to each other via the communication line 3, and objects stored by one terminal 2 in the memory 22 need not be shared with the user of another terminal 2.

Fourth Modification

Although the processor 21 of the terminal 2 in the above-described exemplary embodiment receives a change-to-follow command to change a first object to a second object and a command to end the change to follow by changing a second object back to a first object, the processor 21 may receive a command to change the display form of a second object.

Figure 21:
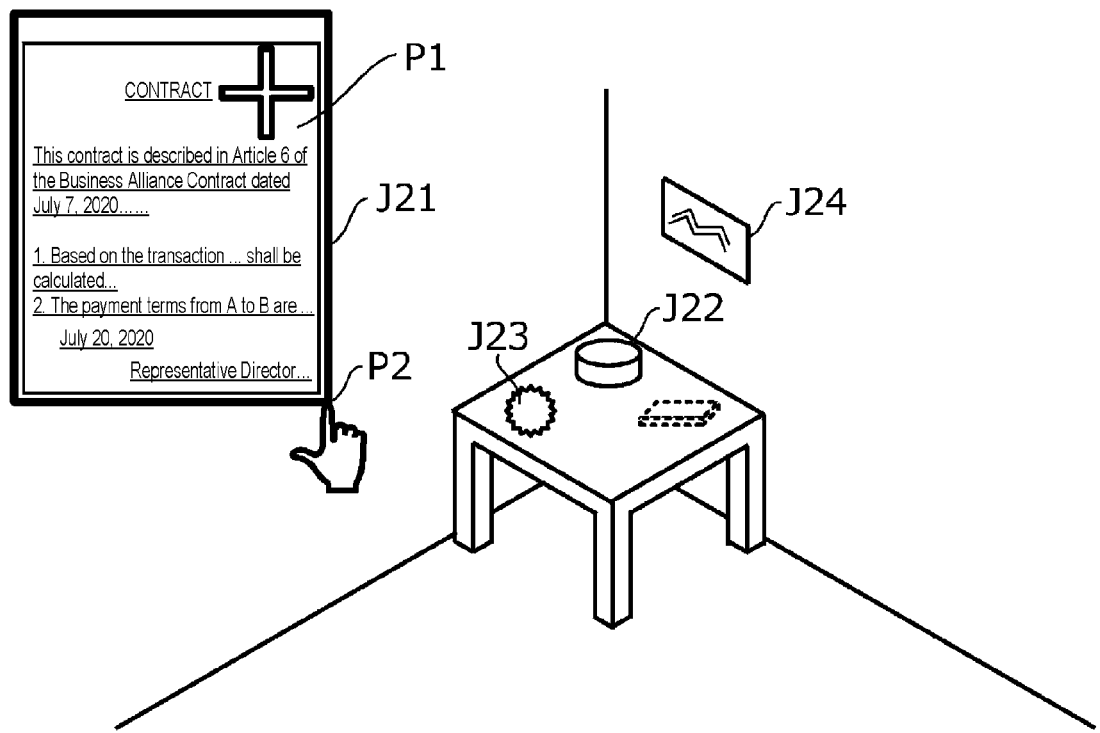
FIG. 21 is a diagram illustrating how the display form of a second object is changed.

FIG. 21 is a diagram illustrating how the display form of a second object is changed. For example, for the object J21 to which a change-to-follow command has been given to start editing, the user gives a command to change the display magnification thereof. This command is given by the user by, for example, moving the operation point P2 to the lower right-hand corner of the object J21, performing a predetermined gesture, and further moving the operation point P2. The processor 21 may simply analyze this operation, and change the display magnification of the object J21 so that the operation point P2 after the movement will overlap the lower right-hand corner of the object J21.

In addition, in the case where the user is allowed to operate multiple operation points P2, the user may perform operations such as so-called pinching-in or pinching-out to bring these operation points closer to or further from each other, and give a command to change the display magnification of a second object. In addition, besides a command to change the display magnification of a second object, the terminal 2 may receive an operation to change the display form of a second object. In this case, the terminal 2 receives, for example, a command to change the color or decorations such as the frame of a second object.

In addition, an operation for changing the display form of a second object may be performed using the gaze. For example, the display magnification of a second object may be changed when the user focuses his/her gaze on any of the four corners of a second object over a predetermined time or longer, and then moves the gaze. In this case, an operation performed by the user is preferably an operation that satisfies a condition that the direction of the user's gaze on a second object and the position at which the second object is displayed have a predetermined relationship (second relationship). In short, the processor 21 is an example of a processor that changes the display form of a second object in the case where the direction of the user's gaze on the second object and the position at which the second object is displayed have a predetermined second relationship.

After the display form is changed, the above-mentioned second object remains as it is as a second object. For that reason, the object J21 whose magnification illustrated in FIG. 21 has been changed remains to fit in the user's field of view even when the user moves his/her head.

Figure 22:
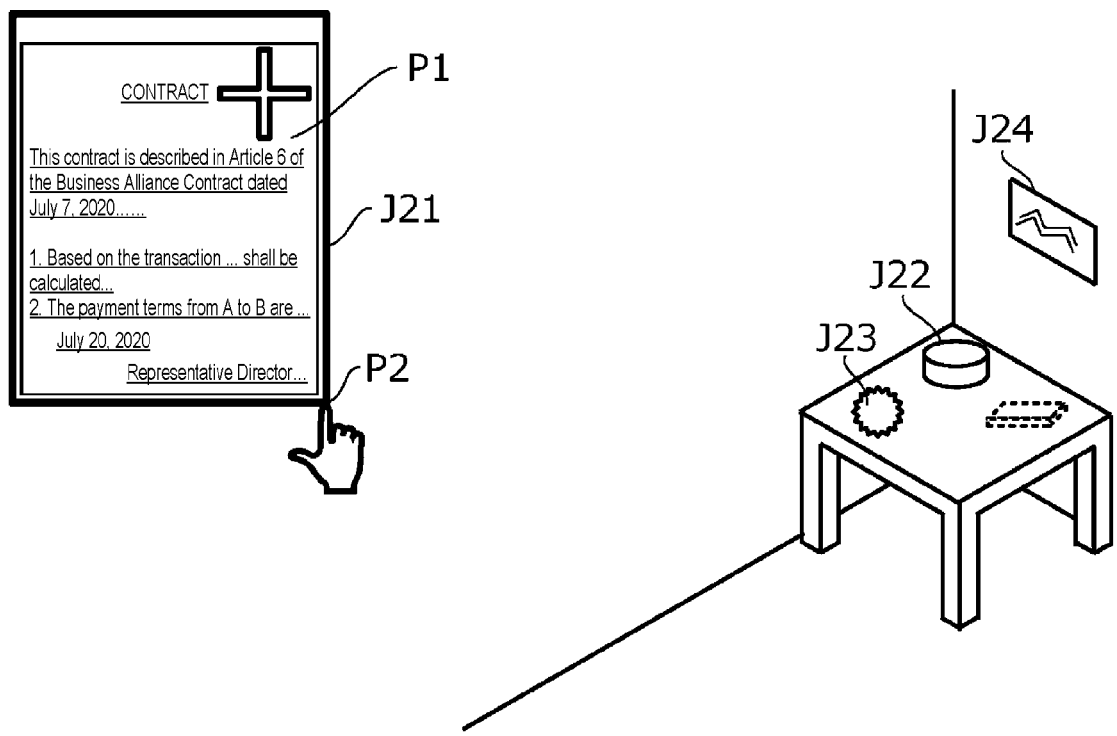
FIG. 22 is a diagram illustrating the virtual space viewed when the user turns his/her head.

FIG. 22 is a diagram illustrating a virtual space viewed when the user turns his/her head. When the user turns his/her head to the left while looking at the virtual space illustrated in FIG. 21, because first objects such as the objects J22, J23, and J24 are displayed at positions corresponding to the first coordinate system independent of the user's head movements, the relative positions of the origin O2, which is the center of the user's field of view, and these first objects change. For that reason, any of these first objects may move out of the user's field of view and become invisible to the user.

In contrast, the object J21, which has been changed to a second object, is displayed at a position corresponding to the second coordinate system dependent on the user's head movements. For that reason, the relative positions of the origin O2, which is the center of the user's field of view, and the object J21 do not change, and the user will not lose sight of the object J21.

Fifth Modification

In the above-described exemplary embodiment, one that has been changed by the user from a first object to a second object is only the object J21; however, the terminal 2 may apply a change to follow to multiple objects. In the case of applying a change to follow to multiple objects, the terminal 2 may change the size at which second objects are displayed depending on the number of the second objects.

Figure 23:
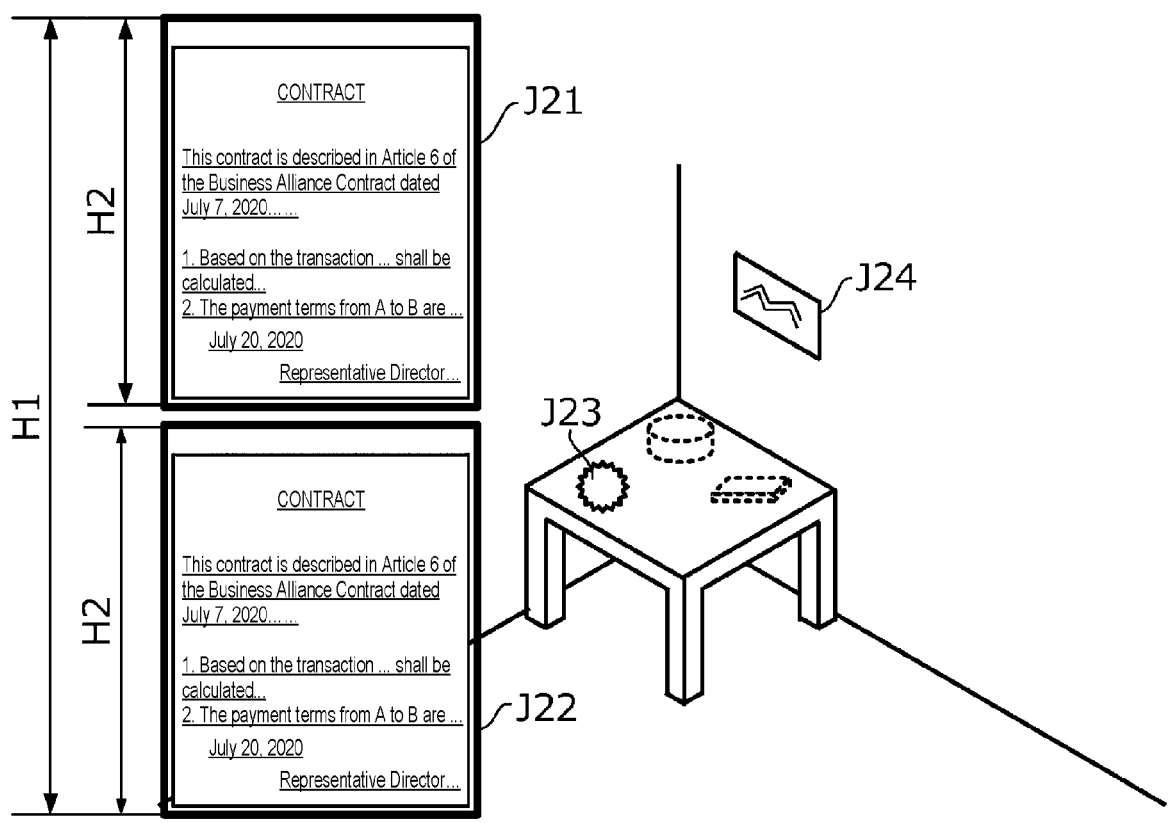
FIG. 23 is a diagram illustrating exemplary second objects whose size is determined according to the number of the second objects.

FIG. 23 is a diagram illustrating exemplary second objects whose size is determined according to the number of the second objects. When the user gives a change-to-follow command to change the object J22 in addition to the object J21, the processor 21 of the terminal 2 determines a height H2 of these objects on the basis of a height H1 of the field of view and the number of these objects (i.e., "two").

That is, the processor 21 may determine the height H2 of each of the object J21 and the object J22, which are objects changed from first objects to second objects, by dividing the height H1 of the field of view by two, which is the number of these objects. In this case, the processor 21 is an example of a processor that changes the size of second objects according to the number of the second objects and displays the second objects. Accordingly, even if the second objects are arranged vertically, the sum of the height H2 of each of the second objects does not exceed the height H1 of the field of view. Accordingly, the second objects do not overlap each other.

In the above example, a value obtained by dividing the predetermined height H1 by the number of the second objects is determined as the height H2 of each of the second objects. Thus, the greater the number of the second objects, the smaller the second objects are displayed. In short, in this case, the processor 21 is an example of a processor that displays each of second objects to be smaller as the number of the second objects increases.

In the above-described example, the processor 21 displays each of second objects to be smaller as the number of the second objects increases. Alternatively, the processor 21 may conversely display each of second objects to be larger as the number of the second objects increases in order that the user may more easily grasp the content of the second objects.

Sixth Modification

Although the processor 21 of the terminal 2 arranges multiple second objects so as not to overlap each other in the above-described modification, the processor 21 may arrange the second objects in other forms. For example, the processor 21 may overlappingly arrange multiple second objects in a predetermined order. In addition, the processor 21 may change the form of arranging and displaying second objects according to the number of the second objects.

Figure 24:
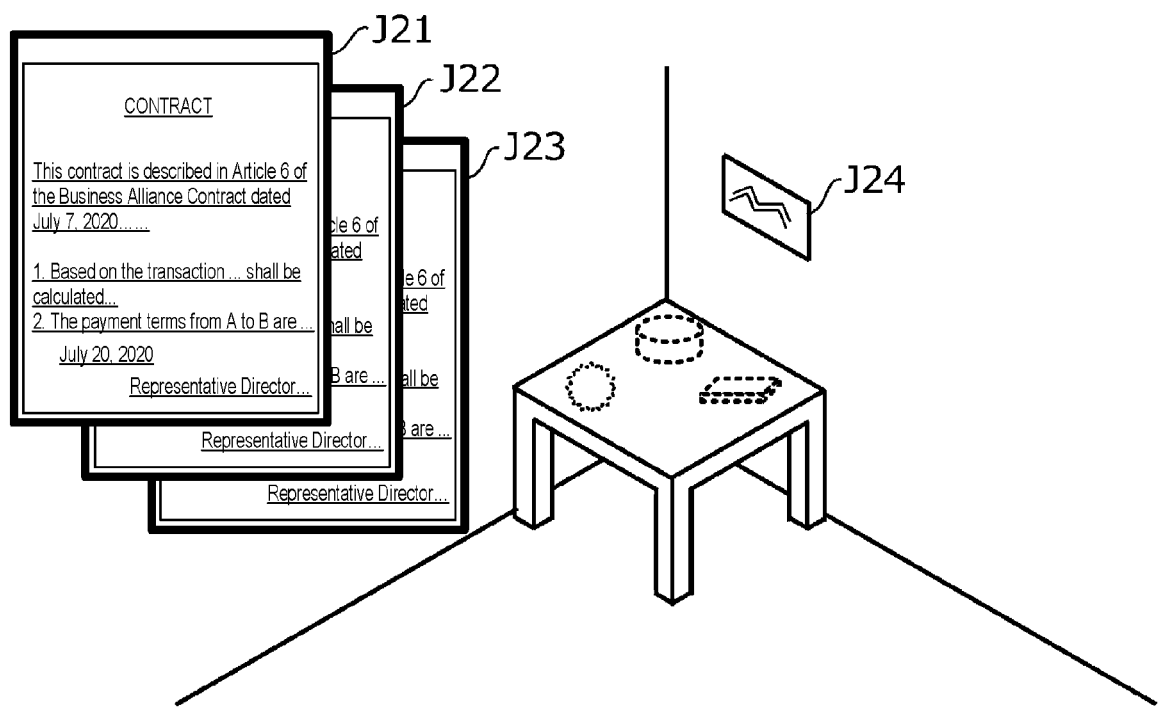
FIG. 24 is a diagram illustrating exemplary second objects whose display rule has changed since the number of the second objects becomes greater than or equal to a threshold.

FIG. 24 is a diagram illustrating exemplary second objects whose display rule has changed since the number of the second objects becomes greater than or equal to a threshold. When the user gives a change-to-follow command to change the object J23 in addition to the objects J21 and J22, the number of the second objects becomes three. In the case where a preset threshold is three, because the number of the second objects has become greater than or equal to the threshold, the processor 21 of the terminal 2 adopts the rule of stacking second objects in a predetermined order, instead of the rule of arranging second objects so that they do not overlap each other, illustrated in FIG. 23, and displays these second objects. In this case, the processor 21 is an example of a processor that, in the case where the number of second objects is greater than or equal to a predetermined threshold, displays the second objects according to a rule different from that in the case where the number is less than the threshold.

In addition, the processor 21 is an example of a processor that arranges and displays the second objects so as not to overlap each other in the case where the number of the second objects is less than the threshold, and arranges and displays the second objects so as to overlap each other in the case where the number of the second objects is greater than or equal to the threshold.

Although the example in which the second objects are arranged so as to overlap each other in the case where the number of the second objects is greater than or equal to the threshold has been discussed, the case is not limited to this example. For example, in the case where the number of the second objects is greater than or equal to the threshold, the processor 21 may reduce the size of the second objects and arrange them side by side, and, in the case where the number of the second objects is less than the threshold, the processor may arrange the second objects without changing the size of the second objects.

Seventh Modification

Although the user gives a change-to-follow command to change a first object to a second object by looking at the first object for three or more seconds in the above-described exemplary embodiment, the user may give this command by performing other operations. For example, the user may perform an operation of editing a first object, that is, an operation of changing the content thereof, thereby giving a command to change a first object to a second object. In this case, an operation of giving the above-described change-to-follow command is an operation of changing the content of a first object.

Eighth Modification

In response to a command to execute a second process that takes precedence over a first process being executed, the processor 21 of the terminal 2 may perform an interruption process of interrupting the first process to execute the second process. In this case, the processor 21 may suspend the displaying of a second object while executing the second process.

Figure 25:
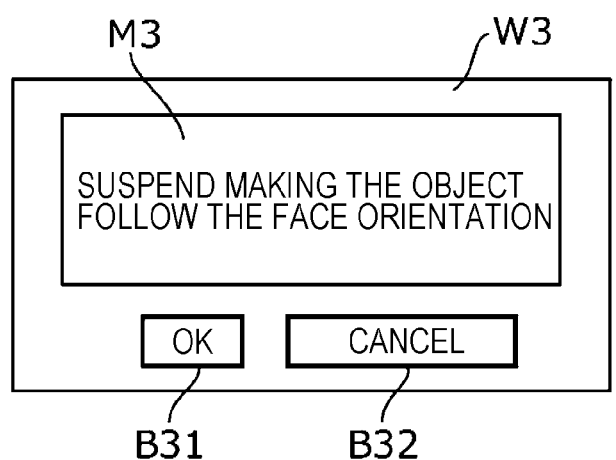
FIG. 25 is a diagram illustrating an example of a dialogue displayed in response to an interruption.

FIG. 25 is a diagram illustrating an example of a dialogue displayed in response to an interruption. For example, in the case where alarm notifications, email notifications, and so forth are defined as a second process that takes precedence over a first process of editing objects, the processor 21 of the terminal 2 performs an interruption triggered by reception of an email message or the like.

At this time, the processor 21 displays the dialogue illustrated in FIG. 25 on the display 25. A dialogue window W3 included in the dialogue displays a message M3, which reads "Suspend making the object follow the face orientation". Under the message M3, a button B31 with the character string "OK" and a button B32 with the character string "cancel" are displayed.

For example, when the user moves an operator such as the user's hand or finger to allow the operation point P2 to overlap the button B31 illustrated in FIG. 25 and makes a predetermined gesture such as tapping, the object J21 which has been changed to follow by the user is suspended from being displayed. In short, the object J21 is no longer displayed at a position corresponding to the second coordinate system, which means that the object J21 may happen to move to a position that does not fit in the user's field of view.

In contrast, in response to completion of the second process such as a notification of email or the like, the processor 21 of the terminal 2 displays, on the display 25, a dialogue for notifying the user that, due to the completion of the interruption, displaying of the second object resumes.

Figure 26:
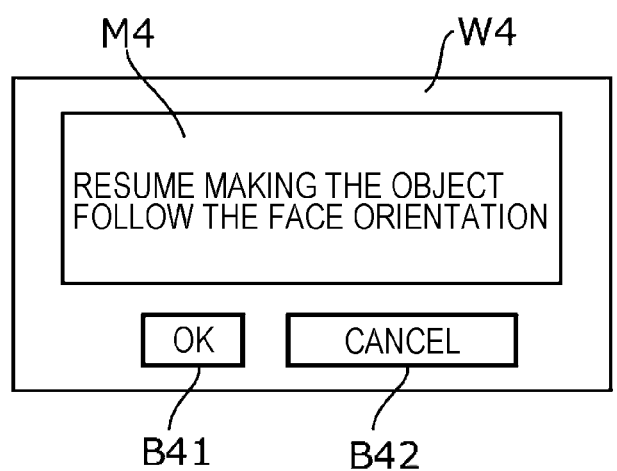
FIG. 26 is a diagram illustrating an example of a dialogue displayed in response to completion of the interruption.

FIG. 26 is a diagram illustrating an example of a dialogue displayed in response to completion of an interruption. A dialogue window W4 included in the dialogue displays a message M4, which reads "Resume making the object follow the face orientation". Under the message M4, a button B41 with the character string "OK" and a button B42 with the character string "cancel" are displayed.

For example, when the user moves an operator such as the user's hand or finger to allow the operation point P2 to overlap the button B41 illustrated in FIG. 26 and makes a predetermined gesture such as tapping, displaying of the object J21, which has been changed to follow by the user, resumes. In short, since the object J21 is displayed at a position corresponding to the second coordinate system, the object J21 fits in the user's field of view and the user will not lose sight of the object J21.

In this case, the processor 21 is an example of a processor that, in response to a command to execute a second process that takes precedence over a first process being executed, suspends displaying of a second object, and, in response to completion of the second process, resumes the suspended displaying of the second object.

Note that the terminal 2 suspends displaying of a second object not only when an interruption process is performed. For example, the terminal 2 may provide a suspend button in the above-mentioned virtual space. In this case, the terminal 2 may suspend displaying of a second object in the case where the user moves an operator such as his/her hand or finger to allow the operation point to overlap the suspend button. Therefore, the processor 21 may simply suspend displaying of a second object when a predetermined condition (second condition) is satisfied.

Note that the terminal 2 resumes displaying of a second object not only when an interruption process is completed. For example, the terminal 2 may provide a resume button in the above-mentioned virtual space. In this case, the terminal 2 may resume displaying of a second object in the case where the user moves an operator such as his/her hand or finger to allow the operation point to overlap the resume button. Therefore, the processor 21 may simply resume displaying of a second object when a predetermined condition (third condition) is satisfied.

In short, the above-described processor 21 is an example of a processor that suspends displaying of a second object at a position corresponding to the second coordinate system in the virtual space when a predetermined second condition is satisfied, and resumes the suspended displaying of a second object when a predetermined third condition is satisfied.

Ninth Modification

In the above-described exemplary embodiment, a program executed by the processor 11 of the information processing apparatus 1 is an example of a program that causes a computer including a processor to execute: displaying, in a virtual space recognized by a user, a first object at a position corresponding to a first coordinate system that is independent of the user's head movement; displaying, in the virtual space, a second object at a position corresponding to a second coordinate system that is dependent on the user's head movement; and changing the first object to the second object in response to an operation performed by the user on the first object.

The program may be provided in a state where the program is recorded on a computer-readable recording medium such as a magnetic recording medium including a magnetic tape and a magnetic disk, an optical recording medium including an optical disk, a magneto-optical recording medium, and semiconductor memory. In addition, the program may be downloaded via a communication line such as the Internet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. An information processing apparatus comprising:
a processor configured to
display, in a virtual space recognized by a user, a first object at a position corresponding to a first coordinate system that is independent of the user's head movement,
display, in the virtual space, a second object at a position corresponding to a second coordinate system that is dependent on the user's head movement, wherein the second coordinate system comprising a face orientation of the user, and
change the first object to the second object in response to an operation performed by the user on the first object, wherein:
the operation is an operation using a gaze of the user, and
the processor is configured to,
analyze the gaze of the user based on a gaze history of the user measured at a predetermined cycle, wherein the gaze history comprising a measurement time and coordinate information of the gaze of the user, in a case where a direction of the gaze and a position at which the first object is displayed have a predetermined first relationship, change the first object to the second object, wherein the second object is set to follow the face orientation of the user, and the predetermined first relationship is satisfied when the direction of the gaze and the position at which the first object is displayed overlap for more than a predetermined amount of time, wherein the processor is configured to suspend displaying of the second object at a position which does not fit in the user's field of view corresponding to the second coordinate system in the virtual space when a predetermined second condition is satisfied, and resume the suspended displaying of the second object to fit in the user's field of view when a predetermined third condition is satisfied, wherein the predetermined second condition is satisfied in response to an interruption process, wherein the interruption process is triggered by a notification, and the predetermined third condition is satisfied when the interruption process is completed.

2. The information processing apparatus according to claim 1, wherein the processor is configured to change a display form of the second object in a case where a direction of a gaze of the user on the second object and a position at which the second object is displayed have a predetermined second relationship.

3. The information processing apparatus according to claim 2, wherein the processor is configured to, in a case where a number of the second objects is greater than or equal to a predetermined threshold, display the second objects according to a rule different from a rule in a case where the number is less than the threshold.

4. The information processing apparatus according to claim 3, wherein the processor is configured to arrange and display the second objects so as not to overlap each other in a case where the number of the second objects is less than the threshold, and arrange and display the second objects so as to overlap each other in a case where the number of the second objects is greater than or equal to the threshold.

5. The information processing apparatus according to claim 2, wherein the processor is configured to change a size of the second objects according to a number of the second objects, and display the second objects.

6. The information processing apparatus according to claim 1, wherein the processor is configured to, in a case where a number of the second objects is greater than or equal to a predetermined threshold, display the second objects according to a rule different from a rule in a case where the number is less than the threshold.

7. The information processing apparatus according to claim 6, wherein the processor is configured to arrange and display the second objects so as not to overlap each other in a case where the number of the second objects is less than the threshold, and arrange and display the second objects so as to overlap each other in a case where the number of the second objects is greater than or equal to the threshold.

8. The information processing apparatus according to claim 1, wherein the processor is configured to change a size of the second objects according to a number of the second objects, and display the second objects.

9. The information processing apparatus according to claim 8, wherein the processor is configured to display each of the second objects to be smaller as the number of the second objects increases.

10. The information processing apparatus according to claim 1, wherein the operation is an operation of changing content of the first object.

11. The information processing apparatus according to claim 1, wherein the processor is configured to change the second object to the first object when a predetermined first condition is satisfied.

12. The infoi nation processing apparatus according to claim 1, wherein:

the processor is configured to suspend the displaying of the second object in response to a command to execute a second process that takes precedence over a first process being executed, and resume the suspended displaying of the second object in response to completion of the second process.

13. A non-transitory computer readable medium storing a program causing a computer to execute a process, the process comprising:

displaying, in a virtual space recognized by a user, a first object at a position corresponding to a first coordinate system that is independent of the user's head movement;

displaying, in the virtual space, a second object at a position corresponding to a second coordinate system that is dependent on the user's head movement, wherein the second coordinate system comprising a face orientation of the user; and changing the first object to the second object in response to an operation performed by the user on the first object, wherein:

the operation is an operation using a gaze of the user, and the process comprising:

analyzing the gaze of the user based on a gaze history of the user measured at a predetermined cycle, wherein the gaze history comprising a measurement time and coordinate information of the gaze of the user, in a case where a direction of the gaze and a position at which the first object is displayed have a predetermined first relationship, changing the first object to the second object, wherein the second object is set to follow the face orientation of the user, and the predetermined first relationship is satisfied when the direction of the gaze and the position at which the first object is displayed overlap for more than a predetermined amount of time, wherein the process further comprising:

suspending displaying of the second object at a position which does not fit in the user's field of view corresponding to the second coordinate system in the virtual space when a predetermined second condition is satisfied, and resuming the suspended displaying of the second object to fit in the user's field of view when a predetermined third condition is satisfied, wherein the predetermined second condition is satisfied in response to an interruption process, wherein the interruption process is triggered by a notification, and the predetermined third condition is satisfied when the interruption process is completed.

* * * * *